July 19, 1932.  E. S. REILAND ET AL  1,868,075
PISTON AND RING
Filed Oct. 29, 1926
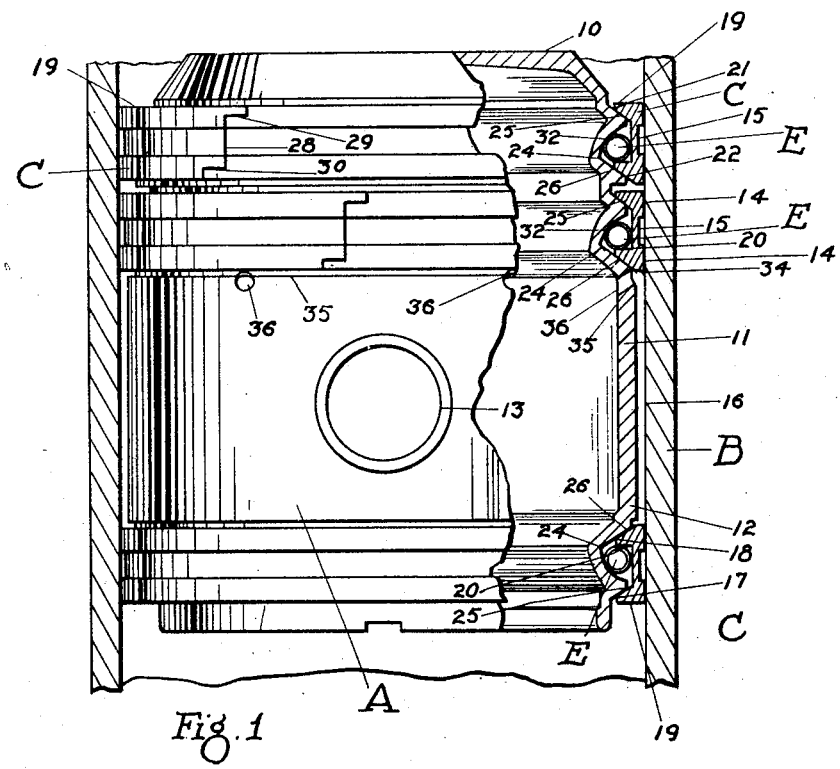
Fig. 1
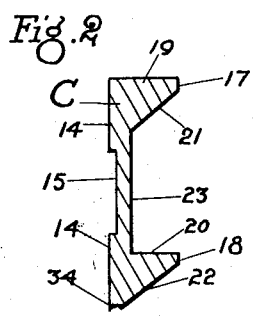
Fig. 2
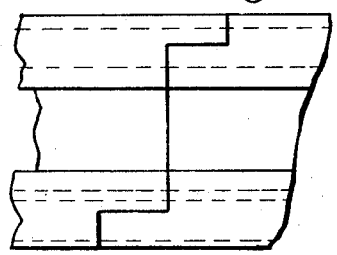
Fig. 3
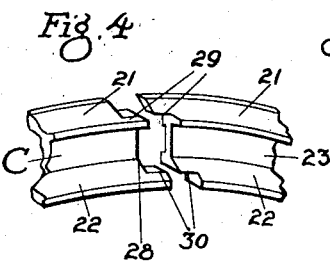
Fig. 4
Fig. 5
Inventor
Ernest S. Reiland
Peter M. Reiland
By Howard Fische
Attorney Patented July 19, 1932

1,868,075

UNITED STATES PATENT OFFICE

ERNEST S. REILAND AND PETER M. REILAND, OF ST. PAUL, MINNESOTA

PISTON AND RING

Application filed October 29, 1926. Serial No. 145,066.

Our invention relates to piston and rings wherein it is desired to provide means for centering the piston in the cylinder so that as the piston reciprocates back and forth in the engine, it is held positively centered and at the same time is prevented from piston clearance slap which is particularly true in aluminum and alloyed pistons where sufficient clearance is necessary to allow for expansion.

A feature of our invention resides particularly in a piston which can be made of aluminum or alloy metal having a light weight and of such a construction as to be permitted to be fitted very loosely in the cylinder. This will allow for the expansion of the metal without the binding of the piston or dragging of the same on the cylinder wall, in fact, our piston is so constructed and so held by our bearing rings that it is possible to make the diameter of the piston so small that it would be impossible for it to expand sufficiently under ordinary conditions to bind in the cylinder.

Our invention includes a bearing ring of a particular construction and having a particular function in operation which is adapted to hold the piston centered in the cylinder during its reciprocation.

Our piston ring functions automatically to center the piston and provides the necessary bearing for the piston in the cylinder so that the piston may run true without clearance slap and practically silent within the cylinder on either stroke of the connecting rod.

Our piston ring is designed to provide a double bearing which extends annularly and which engages with complemental bearing surfaces formed on the piston. The bearing of the piston ring on the complemental surfaces formed in the piston, which are approximately in parallel relation, is such that during the explosion in the cylinder, the pressure of the explosion is directed against the upper, broad, edge so that the pressure of the explosion in the cylinder will assist in forcing the bearing surfaces of the ring, which extend on a bevel, into contact with the complemental bearing surfaces in the piston so as to provide a tight joint between the piston and piston ring and at the same time to automatically cause the piston ring to bear firmly against the cylinder wall to provide the desired compression in the cylinder. The operation of the piston and ring is automatically in the centering of the piston body in the cylinder and the positioning of the piston rings in operative position.

In our piston the rings have a double function in forming the compression rings for the cylinder at the head of the same and also in providing centering and guiding means for the piston at the head and at the skirt so that the piston is held centered at all times and is positively held against piston clearance slap with a quiet operating means which functions to provide a bearing for the piston by the broad faced bearing rings which are partly cut away in a manner so as to extend the bearings to the outer edges of the rings and we thereby provide a bearing for the piston which permits the same to run very freely in the cylinder.

In fact, we have found that our pistons and bearing rings run much more freely than any pistons or piston rings which have been used heretofore insofar as we know and we believe that this is an important feature of our invention as it permits us to secure a higher compression by the tests which we have made and yet reduce the frictional surface ordinarily contacting with the cylinder wall so that our pistons seem to run very freely in the cylinders when in operation.

Our invention includes resilient means adapted to be positioned within the rings and thereby practically concealed back of the same. This resilient means is adapted to function to hold the piston rings under spring tension in contact with the bearing surfaces on the piston thereby providing a double comparatively oil tight joint between the piston and ring and between the cylinder wall and the piston and ring. This resilient means operates automatically to hold the piston ring against slapping in relation to the piston and is concealed and protected by the ring. The invention includes a formation of the piston so as to cause the resilient means for engaging the ring to have a tendency to contract inwardly, the formation in the piston being of an arcuated nature and the piston ring is provided with a shoulder against which the resilient means engages so as to hold the piston ring under spring tension with the piston and cylinder wall at all times. The piston ring of itself has an expanding nature as the piston rings are ordinarily contracted into position on the piston and as the rings are contracted the resilient means back of the piston ring is adapted to be slightly expanded, thus providing the necessary tension for holding the piston ring under tension on the bearing surfaces on the piston and preventing any slapping or clicking of the piston rings in the operation of the piston.

It is also a feature of our invention to provide a particular joint to our rings whereby the joint is adapted to overlap on the bevel bearing surfaces on the piston and on the ring so that when the ring is in position on the cylinder, the ends of the ring over-lap in a manner to form a practically oil and compression tight joint. This is a very important feature of our invention for it may be well considered that heretofore oil leak together with compression leak has been experienced at the joint of the ordinary piston rings. The construction of our piston ring with the piston is such that wide bearing surfaces are provided and a double offset joint is permitted so that a practically oil and compression tight joint is accomplished.

Our invention also includes oil control means in the formation of the bearing ring and openings formed in the piston which are particularly adapted to the ring just above the wrist pin bearing of the piston. By a sharp edge formed on the lower portion of one of the rings, the oil is held down in the cylinder and adjacent this edge a series of openings extend through the piston permitting the oil to drain back to the crank case.

These objects and details together with other features of our invention will be more fully and clearly set forth in the specification and claims.

In the drawing forming part of this specification:

Figure 1 illustrates a portion of a cylinder showing our piston and rings therein, part of which is broken away and illustrated in cross section.

Figure 2 is an enlarged cross section of one of our piston rings.

Figure 3 is an enlarged detail of a portion of our piston ring.

Figure 4 is a perspective of the double offset joint of our piston ring.

Figure 5 illustrates one of the springs or resilient members used in conjunction with our rings.

In the drawing we have illustrated our piston A with the head portion 10 which in this particular construction projects up slightly above the rings, however, this is not essential or necessary in the construction of our piston; this form of head of the piston is used by a well known make of automobile engines.

Our piston A is designed to be made of aluminum or an alloy of metals to provide a piston with a very light weight but having a substantial unsevered body portion 11 which can be loosely fitted within the cylinder B. Only a portion of the cylinder B is illustrated in the drawing. Therefore, the expansion of the piston A will be considerably less than the diameter in the cylinder B so that the piston A cannot bind or drag in the cylinder.

Our piston A is provided with the skirt 12 which depends from the head portion 10 below the wrist pin bearing 13. It is therefore apparent that the rings for our piston become the compression rings at the top or head and also form guide and bearing rings to center the body of the piston within the cylinder, thus equally spacing the same away from the wall of the cylinder and permitting the use of a piston with a large clearance, having no piston clearance slap.

It is to be considered that the split skirt piston is objectionable also because it requires a re-enforcing of some substantial material to give a proper support for the wrist pin bearing as it is apparent that the force of the explosion in the cylinder coming against the piston is transmitted through the connecting rod to the crank shaft. In our piston we overcome the necessity of splitting the skirt to prevent the piston from expanding too tightly against the cylinder wall and we also overcome the piston clearance slap by providing means for holding the piston centered in the cylinder. This permits us to use a piston body of a much smaller size than could ordinarily be used. Then by reason of the fact that we do not split the piston, we obtain a very substantial and rigid support for the wrist pin bearing of the connecting rod together with a simple inexpensive construction.

Our piston rings C are designed with a wide face having a double bearing surface 14 extending about the same while the center portion 15 is cut away to form a recess, leaving the bearing surfaces 14 on either side of the ring C. This construction provides a ring with the equivalence of a wide bearing face, yet reducing the frictional contact by the recess portion 15 and pressing the bearing surfaces of the ring about the outer edge so that the ring may function in a manner to give the advantages of a wide contact, yet having a much less actual frictional bearing than if the entire width of the ring C engaged the cylinder wall 16.

The ring C is formed with inwardly projecting portions 17 and 18 which have shoulder portions 19 and 20 respectively projecting approximately at right angles to the face 14 and beveled surfaces 21 and 22 respectively which extend approximately parallel to each other to provide beveled bearing surfaces for the back of the ring C. This construction provides the ring C with a cross section wherein the portions 17 and 18 are practically of a triangular shape which are joined together integrally by the center portion 23 of a narrow thin wall nature in cross section as illustrated in Figure 2. By this construction of the ring C in addition to the spaced apart bearing surfaces 14 which provide the equivalent of a wide bearing for the piston ring C against the wall 16 of the cylinder, we provide the spaced apart beveled bearing surfaces 21 and 22 which are adapted to support and position the cylinder A in a manner to center the same in the reciprocation of the piston within the cylinder.

The piston A is formed with annular recesses 24 to provide portions on the outer surfaces of the piston which may be machined to form the beveled surfaces 25 and 26, adapted to form the bearing surfaces for the beveled surfaces 21 and 22 of the piston ring C so that the piston ring C when positioned on the piston A will be adapted to bear with the surfaces 21 and 22 against the complemental surfaces 25 and 26 respectively.

We provide a ring C which having a wide nature, in cross section, permits the formation of a double offset joint so as to provide a piston ring C with practically an oil and compression tight joint. This permits us to cut the ring C to provide the double offset joint 28 with overlapping end portions 29 and 30. The end portions 29 and 30 are of practically the same general construction and are so formed as to provide a longitudinal cut portion which permits the lapping of the ends 29 and 30 to come at a point within the surfaces 21 and 22 so that when the rings C are held in position on the cylinder A, the overlapping ends 29 and 30 will bear against the beveled surfaces 25 and 26 respectively in a manner to close the joints or overlapping ends of the ring and thereby provide a piston ring which may be used as a compression ring, a bearing ring and a practically oil tight ring. It would be readily apparent that the bearing of the surfaces 21 and 22 against the beveled surfaces 25 and 26 will approximately prevent oil from creeping back of the ring and this is a very important feature of our invention.

To facilitate the proper operation of our piston rings, which are adapted to form bearing, compression and oil control rings, we provide a coil spring E which is adapted to be positioned between the portions 17 and 18 with the spring E bearing against the inner shoulder 20 of the rings C and being practically concealed within the recess 24 by the ring C. The recesses 24 in the piston A are formed with an arcuated surface 32 to provide a bearing surface and recess for the coil spring E on the piston A and to cause the spring E to have a tendency to operate more readily with the piston rings C to cause them to be pressed firmly against the bearing surfaces 25 and 26 on the piston, in fact, the coil springs E will be inclined to draw together and move into the depth of the recess 24 while the engagement of the shoulder 20 of the ring C with the spring E will have a tendency to expand the springs and force the same slightly out of the depth of the recess 24, thus as the rings C are positioned within the cylinder B, they are compressed sufficiently to properly contact with the wall 16 and a sufficient tension is brought to bear against the spring E which extends annularly in the groove 24 to hold the rings constantly under spring tension against the beveled bearing surfaces 25 and 26 formed in the piston A.

We have illustrated two of our rings C positioned in the head of the piston A which are adapted to form bearing and compression rings operating in a manner to center the head of the piston in the cylinder B being held by the spring means E. These rings are practically silent in the operation or reciprocation of the piston and at the same time are held in a manner so as to press against the surfaces 25 and 26 with the surfaces 21 and 22 respectively to form a double oil and compression tight joint in back of the ring while the outer bearing surfaces 14 form a tight joint with the wall 16 of the cylinder. It will therefore be apparent that a very important function is performed by our rings C in overcoming primary difficulties which have been apparent in the operation of pistons heretofore. The springs E are protected and practically concealed by the rings C and may be of any suitable construction or nature to function to hold the rings C bearing under spring tension against the surfaces 25 and 26. As the surfaces 21 and 22 are of practically the same bevel and lie in practically the same plane as the surfaces 25 and 26, it will readily be apparent that the ring C will form the desired means to cause the body of the piston A to be centered within the cylinder.

The upper ring C on the piston A is adapted to receive a portion of the force of the explosion and compression on the shoulder 19 assisting the spring means E in forcing the ring tightly against the surfaces 25 and 26 in a manner to provide means for centering the piston A automatically and to form a compensated annular seal about the piston, operating automatically in the reciprocation of the same.

One of the rings C, preferably the lower of the two rings placed in the head of the piston A, is provided with a sharp annular edge 34, clearly illustrated in the enlarged view in Figure 2, so as to provide a means of collecting the oil off of the wall 16 and we provide an annular groove 35 in the piston A adjacent the edge 34 together with a series of openings 36 extending through the wall of the piston so as to permit the surplus oil to be drained through the openings 36 back into the crank case. This construction permits us to form our piston A with the proper lubrication extending up to the rings C, yet preventing a surplus of oil from building up below the rings but permitting it to drain back through the piston to the crank case.

The skirt 12 of our piston A is provided with a similar groove or recess 24 which is inverted in relation to the position of the grooves 24 at the top of the piston and within this groove we provide a bearing ring C identical to the other bearing and compression rings but adapted to act as a bearing for the lower or skirt end of the piston and which is adapted to be held in position against the beveled surfaces 25 and 26 by the spring means E in the same manner as the other rings are held at the top of the piston.

In accordance with the patent statutes, we have described the principles of operation of our piston and ring and while we have illustrated a particular formation and construction of the same in the drawing, we desire to have it understood that the same is only illustrative as a means of carrying out our invention and that the same may be applied and carried out by other means and to other uses without departing from the spirit of our invention and within the scope of the following claims:

We claim:

1. A piston including, a body portion having beveled surfaces extending parallelly, a piston ring adapted to engage said surfaces with complemental bearing surfaces extending at approximately the same bevel as the said beveled surfaces on said piston and spring means between said ring and said piston for holding said piston ring under spring tension, in contact with said bearing surfaces formed in said piston.

2. A self-centered piston including, bearing and compression rings positioned at the head and skirt of said piston, resilient means for holding said rings in contact with said piston and a pair of parallel complemental beveled surfaces formed on said piston and rings to cause an annular seal to be formed about said piston between the piston and rings and between the rings and a cylinder wall.

3. A piston ring including spring means, spaced apart annular bearing surfaces on the outer face thereof, a right angular shoulder extending from one side of said ring and annular beveled bearing surfaces formed on the inner surface of said ring and spaced apart with a right angular shoulder between said bearing surfaces adapted to form engaging means for said spring means within the ring to hold the ring in operative position under spring tension on a piston.

4. A piston and bearing packing means, including, a piston ring having a pair of parallel spaced apart beveled bearing surfaces, complemental beveled bearing surfaces formed in said piston wall and spring means concealed by said ring and adapted to engage the same between said bearing surfaces in a manner to hold said ring bearing against the beveled surfaces formed on said piston under spring tension.

5. A piston including, means for centering the same in a cylinder automatically in the reciprocation of the piston, including bearing surfaces formed on said piston, a ring adapted to engage said bearing surfaces and resilient coiled spring means interposed between said piston and ring and positioned between said bearing surfaces in a manner to hold said ring under spring tension against said bearing surfaces.

6. A piston and ring including, a bearing surface formed on said piston having spaced apart beveled faces, a ring adapted to engage said faces to form a compression and oil tight joint between said piston and ring and resilient means engaging said ring between said faces for holding said ring in contact with said faces.

7. A piston and bearing including, ring members adapted to be interposed between the piston and cylinder wall, complemental beveled bearing surfaces formed on said ring and piston, resilient means interposed between the beveled surfaces of said ring and piston to hold said ring in contact with said beveled surfaces, a sharp edge formed on one of said rings adapted to collect oil from the cylinder wall and openings formed through said piston adjacent said sharp edge to drain the surplus oil back through said piston.

8. A piston and bearing including, a cylindrical body portion, bearing surfaces formed in annular grooves extending about said body portion, bearing ring members adapted to fit said grooves and resilient coiled means with its axis transversely disposed to the piston axis back of said ring members to hold said bearing surfaces in operative position under spring tension.

9. A piston and bearing including, a series of bearing rings positioned in the head of said piston, pairs of parallel complemental beveled bearing surfaces formed in said piston and rings, resilient means between said bevelled bearing surfaces for holding said rings in operative position under spring tension, and an inverted bearing ring positioned in the skirt of said piston having complemental bearing surfaces with the piston and resilient means between the bearing surfaces for holding said ring in operative position.

10. A piston including bearing and compression rings, each of which are formed with a cross sectional shape adapted to simulate a pair of equal right angular triangles, an integral web portion formed in said rings, complemental bearing surfaces formed in said piston to receive the hypotenuse sides of said rings and resilient means for holding said rings in operative position under spring tension against said complemental bearing surfaces.

11. A piston including, beveled bearing surfaces extending in pairs in approximately parallel planes, a recess portion interposed between said pairs of bearing surfaces one side of said recess portion having an arcuated formation.

ERNEST S. REILAND.
PETER M. REILAND.